(12) United States Patent
Elmore

(10) Patent No.: US 6,264,727 B1
(45) Date of Patent: *Jul. 24, 2001

(54) FILTER FAN

(76) Inventor: Robert L. Elmore, 900 NW. 8th Ave., Fort Lauderdale, FL (US) 33311

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,819

(22) Filed: Jul. 20, 1999

(51) Int. Cl.⁷ .............................. B01D 53/04; B01D 46/10
(52) U.S. Cl. .............................. 95/143; 95/273; 95/278; 96/135; 96/136; 96/138; 96/147; 55/357; 55/471; 55/493; 55/521
(58) Field of Search .............................. 95/141, 143, 273, 95/286, 287; 96/135, 136, 138–140, 147, 154; 55/356, 357, 467, 471–473, 793, 501, 521

(56) References Cited

U.S. PATENT DOCUMENTS

| | | | | |
|---|---|---|---|---|
| 2,114,761 | * | 4/1938 | Crider ............................ | 55/471 |
| 2,362,933 | * | 11/1944 | Schaefer ......................... | 55/471 X |
| 2,415,621 | * | 2/1947 | Arnhym .......................... | 55/467 X |
| 2,992,701 | * | 7/1961 | White ............................. | 55/467 X |
| 3,369,348 | | 2/1968 | Davis ............................. | 55/374 |
| 3,422,263 | * | 1/1969 | Asahina .......................... | 55/467 X |
| 3,523,409 | * | 8/1970 | Paterson ......................... | 55/471 |
| 3,577,710 | * | 5/1971 | Feldman ......................... | 55/467 X |
| 3,802,168 | * | 4/1974 | Deckas ........................... | 55/473 |
| 4,121,916 | * | 10/1978 | Fricke ............................ | 55/472 X |
| 4,339,250 | * | 7/1982 | Thut .............................. | 55/467 X |
| 4,370,155 | * | 1/1983 | Armbruster ..................... | 55/472 X |
| 4,385,911 | * | 5/1983 | Popeil et al. ................... | 55/472 X |
| 4,526,592 | * | 7/1985 | Armbruster ..................... | 55/472 X |
| 4,597,781 | * | 7/1986 | Spector .......................... | 55/467 X |
| 4,627,862 | * | 12/1986 | Frei et al. ....................... | 55/467 X |
| 4,629,479 | * | 12/1986 | Cantoni .......................... | 55/471 X |
| 4,629,482 | * | 12/1986 | Davis ............................. | 55/471 X |
| 4,701,195 | * | 10/1987 | Rosendall ....................... | 55/473 X |
| 4,737,173 | * | 4/1988 | Kudirka et al. ................. | 55/471 X |
| 4,749,390 | * | 6/1988 | Burnett et al. .................. | 55/467 X |
| 4,778,496 | * | 10/1988 | Conrad .......................... | 55/472 |
| 4,781,526 | * | 11/1988 | Mead ............................. | 55/493 X |
| 4,900,344 | * | 2/1990 | Lansing ......................... | 55/467 X |
| 4,900,346 | * | 2/1990 | Lutz .............................. | 55/471 X |
| 5,022,900 | * | 6/1991 | Bar-Yona et al. ............... | 55/473 X |
| 5,133,788 | * | 7/1992 | Backus .......................... | 55/467 |
| 5,423,903 | * | 6/1995 | Schmitz et al. ................. | 55/501 X |
| 5,443,625 | * | 8/1995 | Schaffhausen .................. | 55/493 X |
| 5,453,049 | * | 9/1995 | Tillman, Jr. et al. ............ | 55/467 X |
| 5,562,407 | * | 10/1996 | Cielo ............................. | 55/471 X |

(List continued on next page.)

FOREIGN PATENT DOCUMENTS

| | | | | |
|---|---|---|---|---|
| 1-168315 | | 7/1989 | (JP) . | |
| 2-052019 | * | 2/1990 | (JP) ........................... | 55/471 |
| 2-181094 | * | 7/1990 | (JP) ........................... | 55/471 |
| 2-229517 | * | 9/1990 | (JP) ........................... | 55/471 |

\* cited by examiner

Primary Examiner—Robert H. Spitzer
(74) Attorney, Agent, or Firm—James Creighton Wray; Meera P. Narasimhan

(57) ABSTRACT

The present invention is a portable filter fan. A highly efficient and inexpensive air filtering device is made from a portable box fan with a pleated sheet o micron particle filter installed externally in channels on the inlet side of the fan housing. Activated charcoal used for removing odors and volatile organic compounds from the air is prevented from egress by a second similar filter mounted externally in channels on the outlet side of the fan housing. A low-cost fan filter sitting at floor level circulates the air and cleans the air more efficiently than many other filters placed in ceiling or attic areas. Gravity pulls the floating particles in the air downward toward the floor, and the new portable air filtering box fan draws and holds the particles on the filter.

9 Claims, 1 Drawing Sheet

U.S. PATENT DOCUMENTS

| | | | |
|---|---|---|---|
| 5,641,343 | * | 6/1997 | Frey ................................. 55/471 X |
| 5,660,605 | * | 8/1997 | Chan et al. ...................... 55/471 X |
| 5,762,665 | * | 6/1998 | Abrahamian et al. ............ 55/473 X |
| 5,801,583 | * | 9/1998 | Pippel et al. ........................ 55/467 |
| 5,803,940 | * | 9/1998 | Rick et al. ...................... 55/467 X |
| 5,888,261 | * | 3/1999 | Fortune ............................ 55/467 X |
| 5,925,172 | * | 7/1999 | Rick et al. ...................... 55/467 X |

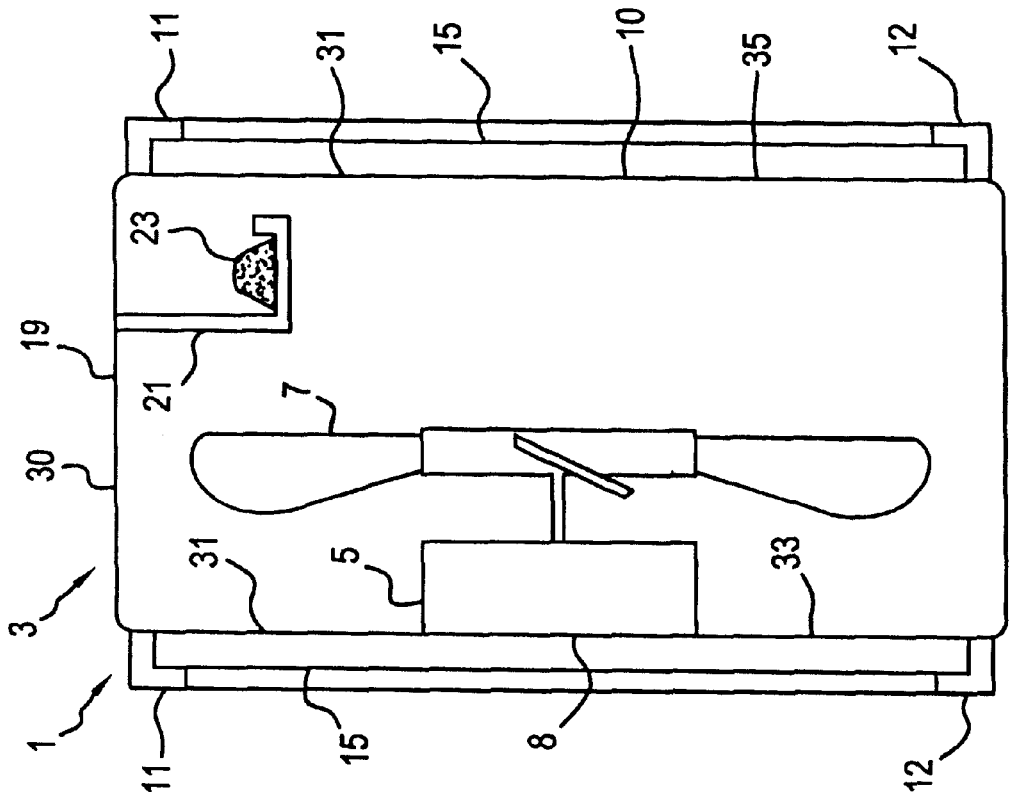
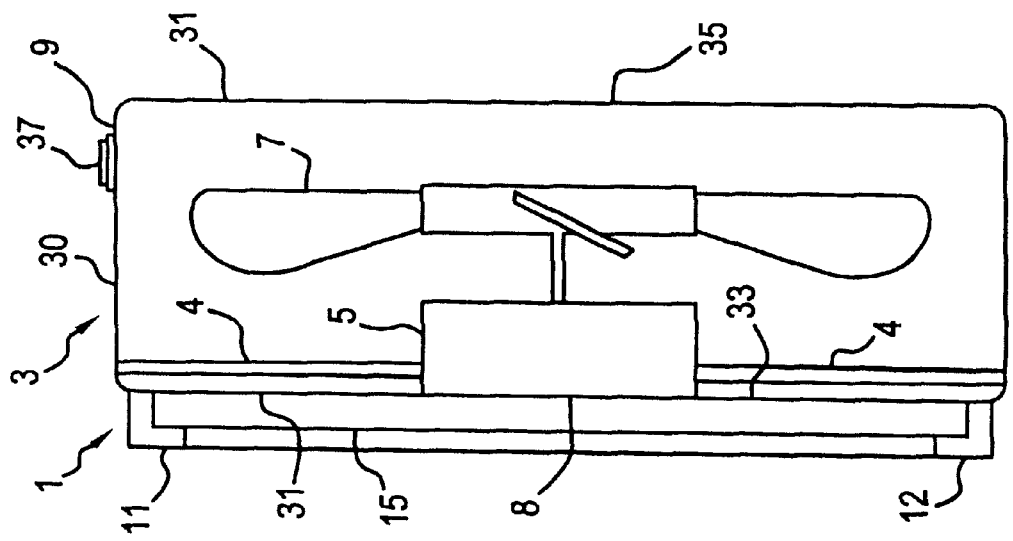

FILTER FAN

BACKGROUND OF INVENTION

The present invention relates to the cleaning of indoor air.

In cleaning and removing particulate from indoor air, a proposed solution provides drawing air through a filter by a fan or blower. Various type of filters are used in the air-conditioning HVAC systems or as portable units containing HEPA filters or electronic filters. However, those systems are complex, expensive and require unique parts that greatly increase their expense.

Needs exist for low cost, efficient, portable air filtering systems.

SUMMARY OF THE INVENTION

The present invention is a portable filter fan. A highly efficient, but inexpensive air filtering device is made from a portable box fan with a filter installed on the incoming side. Low-cost large filters on low-cost fans sitting at floor level circulate air, cleaning the air more efficiently than many other filters placed in ceiling or attic areas or in large air handlers. That is because gravity pulls the floating particles in the air downward toward the floor, and the portable box fan draws the particles through the filter and entraps the particles in the filter.

A portable filter fan is created by attaching at least one filter to the incoming side of the fan, which is a portable fan. To attach the filter to the fan, one or two-inch inward opening channels are positioned along the edges and are affixed to the outside of the fan housing. High efficiency pleated filters and micro particle filters have proven effective as filtering media.

In preferred embodiments, the channel above the filter is removable. That permits periodic cleaning of the filtering media.

In one embodiment, an activated charcoal filter is used to remove volatile organic compounds (VOC's) and odors from the air. Activated charcoal is placed in a rack affixed to the inflow side of the fan housing. Since microscopic particles of the charcoal may break off and possibly contaminate the air, a filter attached to the outflow side of the fan filters out those free activated particles. The activated carbon particles entrapped in an exit filter keep operating to remove VOC's and odors from the air.

These and further and other objects and features of the invention are apparent in the disclosure, which includes the above and ongoing written specifications, with the claims and the drawings.

BRIEF DESCRIPTION OF THE DRAWINGS

FIG. 1 is a side elevation of the portable filter fan.

FIG. 2 is a side elevation of a filter fan modified for removing VOC's and odors from air.

DETAILED DESCRIPTION OF THE PREFERRED EMBODIMENTS

FIG. 1 shows a side view of a portable filter fan 1. The device includes a portable box fan 3 and at least one filter 15 attached to the fan. The fan 3 includes internal support legs 4 which hold motor 5 and fan blades 7 suspended in a housing 9. The housing 9 has a square rigid body 30 with open opposite faces 31 on which protective grills 33, 35 are mounted. The grills prevent fingers from reaching the fan. The grills also provide rigidity to the housing. In some fans the intake grill 33 also supports the lightweight motor 5 which turns the fan 7. Usually the fans are fused to prevent overheating. Even inexpensive square "box" fans have multiple speed settings controlled by a multiple position off on switch 37 mounted on top of the housing. At the present time suitable inexpensive box fans are sold, for example by Olympia, General Electric or Westinghouse, for about $15. The low power fan motors draw a fraction of an amp at 110 VAC house power.

Filter holding channels 12 are mounted at the edges of the fan housing 9 by the intake grill 33. Side and lower channels are fixed to the housing. The upper channel 11 is removable for sliding the filter 15 in or out. Side and lower channels 12 are attached to incoming side 10 of the fan 3. Side and lower channels 12 secure filter 15 to the fan housing 9. The upper channel is removable. The fan 7 creates an airstream through the fan housing 9, and particles floating in the airstream are trapped in the filter 15. A preferred filter 15 appropriate for this purpose is a high efficiency pleated filter and micro particle filters.

One preferred pleated filter is sold in a number of sizes, including an appropriate 20×20×1 inch size by 3M Company identified by the trademark FILTRETE. The red Series 1000 FILTRETE filter is preferred. At the present time it has a retail price of less than about $15. The pleated sheet has a projected area of 400 square inches, and because it is pleated the effective size is at least doubled to 800 square inches of effective filtering. A perforated metal screen on its downstream side and a rigid paper board rim support the pleated sheet. It is believed that airborne particles down to 0.5 microns in size are removed by the filter.

In one test the inexpensive box fan filter combination reduced interior airborne particles from more than 50,000 particles per 0.1 cubic foot to less than 1,000 particles per 0.1 cubic foot, or from 500,000 p/cu.ft. to <10,000 p/cu.ft.

Results are comparable or better than expensive HEPA filters which are 4" thick, or Super HEPA filters which are from 6" to 8" thick, and which because of their thickness cannot be pleated to expand effective area.

After use for a period of time the thin pleated filter is removed from the channels, taken outside and brushed with a soft whisk broom. The filter cleaning may be repeated three or more times before replacing with a new filter. A 20×20×⅛ inch brown foam or sponge sheet may be used to cover the outer surface of the pleated filter for improved appearance and to remove large airborne particles.

It is preferred that one of the new inexpensive box fan filter combinations be placed in a room on the floor where particles accumulate. The fan housing should be placed parallel or perpendicular to a wall so that the air stream blows in a direction parallel to and spaced from a wall to promote circular air currents in the room. It is useful to have several of the inexpensive new units in a house or office. It is especially useful to use the invention in a room during vacuum cleaning, when omicron particles are lifted and blown through the vacuum bag.

In a preferred embodiment, the upper channel 11 rests on the filter and is removable. That permits the filter 15 to be periodically removed, cleaned and replaced. Channels are preferably U-shaped plastic channels with ⅜" legs separated by a 1" web. The inner legs may be fixed to the housing rim around the intake grill by bonding, for example with a Liquid Nail adhesive. The channels extend the entire length of the housing edges. Ends of the four 20" channel pieces are mitered for appearance.

In another embodiment, a channel is located in the middle of each edge of the fan 3. The upper channel may be removable to permit maintenance of the filter 15.

In a modified embodiment shown in FIG. 2, a foraminous rack 21 is attached to and supported in the extended fan housing 19. Activated charcoal 23 is placed in the rack 21, which may be a perforated metal or a screen. The charcoal 23 absorbs odors and VOC's from the air stream. Since microscopic particles of the charcoal 23 may break off and possibly contaminate the air, a second filter 15 is attached to the outflow side 8 of the fan 3 with similar channels 11, 12 outside of exit grill 35 to filter out those free activated charcoal particles, which continue working to absorb volatiles and odors while on the filter.

While the invention has been described with reference to specific embodiments, modifications and variations of the invention may be constructed without departing from the scope of the invention, which is defined in the following claims.

I claim:

1. An air filtering method comprising circulating air with a portable fan having a rectangular housing with square inlet and outlet sides, placing the fan housing on a floor in a room, with the inlet and outlet sides spaced from and perpendicular to a wall of the room, promoting circular circulation within the room, using the fan during vacuum cleaning when micron particles are lifted from the floor and blown through a vacuum cleaner bag and are pulled downward toward the floor by gravity, filtering the air as it is drawn into the fan housing with a square filter having a filtering area of about 400 $in^2$ and having a pleated thin filter sheet with an effective area of at least about 800 $in^2$ secured to the inlet side of the portable fan, and supporting the pleated filter sheet with a screen lifting particles from a rug or floor with a vacuum cleaner, entrapping large particles in the vacuum cleaner and exhausting fine particles suspended in air from the vacuum cleaner into the room floating the exhausted and air suspended fine particles and moving the air suspended fine particles toward the floor under an influence of gravity, moving the air suspended fine particles toward the pleated thin filter under the influence of air circulation around the room by the fan and drawing the fine particles against the pleated thin filter and entrapping the fine particles with the filter.

2. A portable filter fan method comprising providing a fan having a rectangular housing with a flat rectangular base and parallel spaced square inlet and outlet sides, each having side edges, a bottom edge and a top edge, placing the fan housing base on a floor, spacing the fan base from a wall, arranging the inlet and outlet sides perpendicular to a wall of a room for promoting circulation around the room, using the fan during vacuum cleaning when micron sized particles are lifted from the floor and blown through a vacuum bag and pulled downward toward the floor by gravity, circulating indoor air around the room and drawing the air through the fan, providing the inlet side with a face having outer side edges, a top edge and a bottom edge, bonding an inward-opening continuous U-shaped channel to the side edges and the bottom edge of the inlet side of the fan housing in inward and upward opening square configuration, the continuous U-shaped channel having parallel opposite ⅜ inch legs separated by a one inch web, placing in the U-shaped channel a filter having a filtering area of about 400 $in^2$ and having a pleated thin filter sheet with an effective area of at least 800 $in^2$ in a one-inch thick frame inserted in the continuous U-shaped channel, and mounting a downward opening removable upper channel having ⅜ inch legs separated by a one inch web on an upper edge of the filter frame adjacent the top edge of the inlet side of the face.

3. A portable filter fan comprising a fan having a rectangular housing with square inlet and outlet sides and a base for placing on a floor within a room for circulating indoor air in the room and drawing air through the fan housing inlet side, at least one rectangular filter having square overall shape for fitting on the square inlet side of the fan housing and having a projected filtering area of about 400 $in^2$ and having a thin pleated filter sheet with an effective area of at least 800 $in^2$ secured to the fan housing inlet side for cleaning indoor air, at least one attachment on the inlet side of the fan housing for holding the filter on the inlet side in an air stream created by the fan and proximal to the fan, the at least one attachment comprising a bottom channel and side channels attached to edges of the inlet side for receiving the rectangular filter and a removable upper channel resting on a top of the filter, and a screen on the filter adjacent the fan housing inlet side for supporting the filter.

4. The apparatus of claim 3, wherein the at least one pleated filter is a high efficiency pleated filter.

5. The apparatus of claim 3, wherein the at least one filter is a micro particle filter.

6. The apparatus of claim 3, wherein the at least one attachment is permanently attached externally on the fan housing.

7. The apparatus of claim 3, further comprising activated charcoal for removing odors and volatile organic compounds from the air, and a rack attached to the fan housing for holding the activated charcoal.

8. The apparatus of claim 7, wherein the rack is attached to the inlet side of the fan and the at least one filter is attached to the outlet side of the fan.

9. The apparatus of claim 3, wherein the fan is about 20" by 20".

\* \* \* \* \*